United States Patent [19]

Diachuk et al.

[11] 4,038,056
[45] July 26, 1977

[54] KITCHEN HOOD APPARATUS FOR SEPARATING FOREIGN MATTER FROM FLUID

[75] Inventors: Wolodymyr Diachuk, Minneapolis; Reuben N. Palm, Wayzata, both of Minn.

[73] Assignee: Century 21 Pollution Control, Inc., Minneapolis, Minn.

[21] Appl. No.: 555,795

[22] Filed: Mar. 6, 1975

[51] Int. Cl.² .............................................. B01D 47/10
[52] U.S. Cl. ......................................... 55/238; 55/347; 55/456; 55/DIG. 36; 98/115 R; 261/79 A
[58] Field of Search .................................. 55/235-238, 55/455, 456, DIG. 36, 347; 98/115 K; 181/66, 67; 259/4 A, 4 B, 18; 261/79 A

[56] References Cited

U.S. PATENT DOCUMENTS

| | | | |
|---|---|---|---|
| 767,721 | 8/1904 | Swartwout | 55/456 |
| 1,104,717 | 7/1914 | Topf | 55/238 |
| 2,247,285 | 6/1941 | Bingman | 55/238 |
| 3,393,497 | 7/1968 | Donnolly | 55/DIG. 36 |
| 3,827,888 | 8/1974 | Terwilliger et al. | 259/4 A |
| 3,859,063 | 1/1975 | Porter | 55/456 |
| 3,966,443 | 6/1976 | Okano et al. | 55/456 |

*Primary Examiner*—Bernard Nozick
*Attorney, Agent, or Firm*—Burd, Braddock & Bartz

[57] ABSTRACT

A hood assembly for use with cooking equipment having a plurality of units for separating foreign matter from air moving through the hood assembly. Each unit has a cylindrical tubular member having a passage for carrying the air and entrained foreign matter. A plurality of helical elements are located in the passage. The adjacent helical elements are located in 90° relationship relative to each other so that the air moving through the passage is divided into separate helical paths which direct the air in spiral patterns whereby the foreign matter is separated from the air by the mechanisms of centrifugal force, adhesion and impaction. The foreign matter is collected and carried to a container. The cleaned air is recycled into the environment surrounding the hood assembly.

26 Claims, 7 Drawing Figures

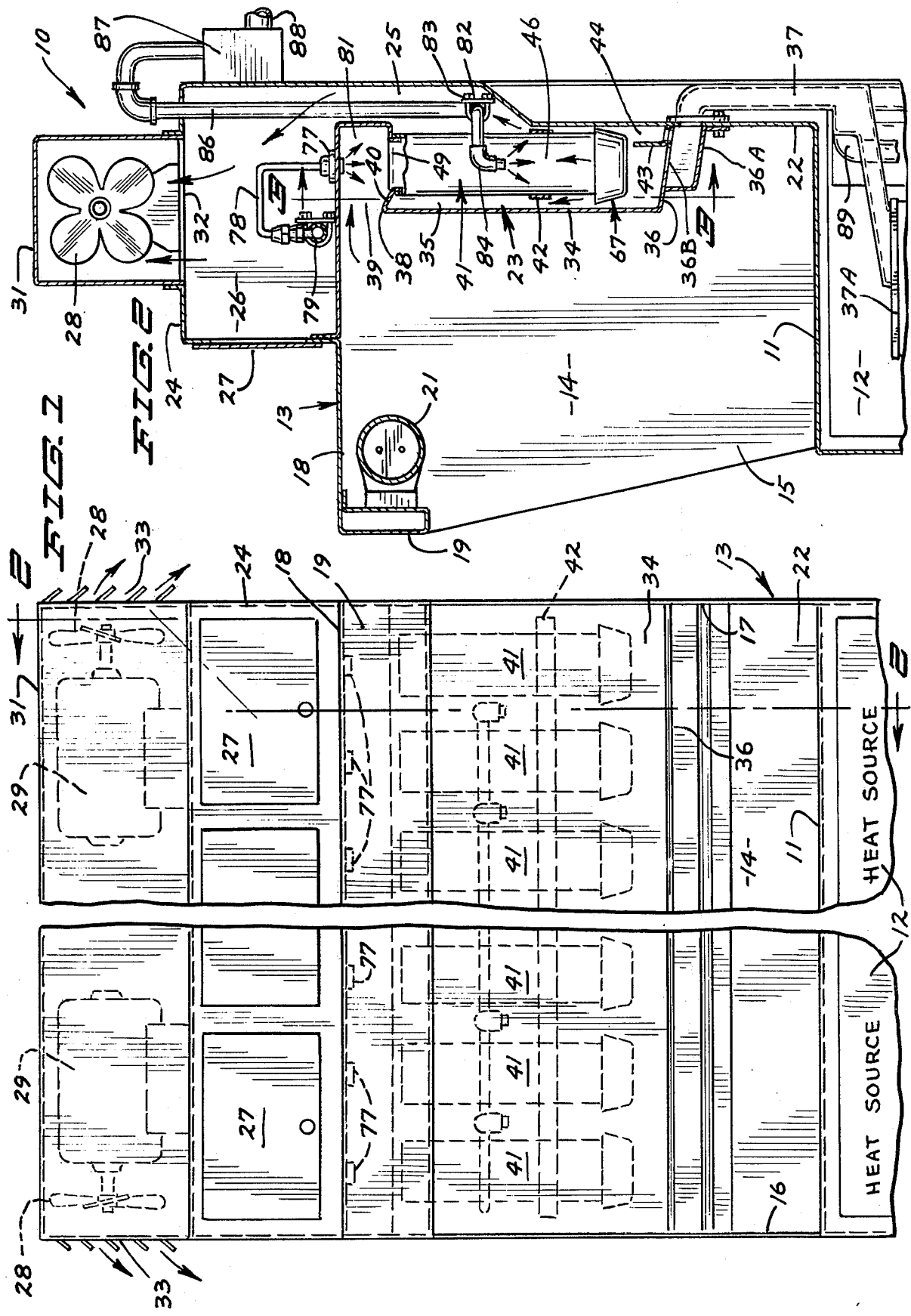

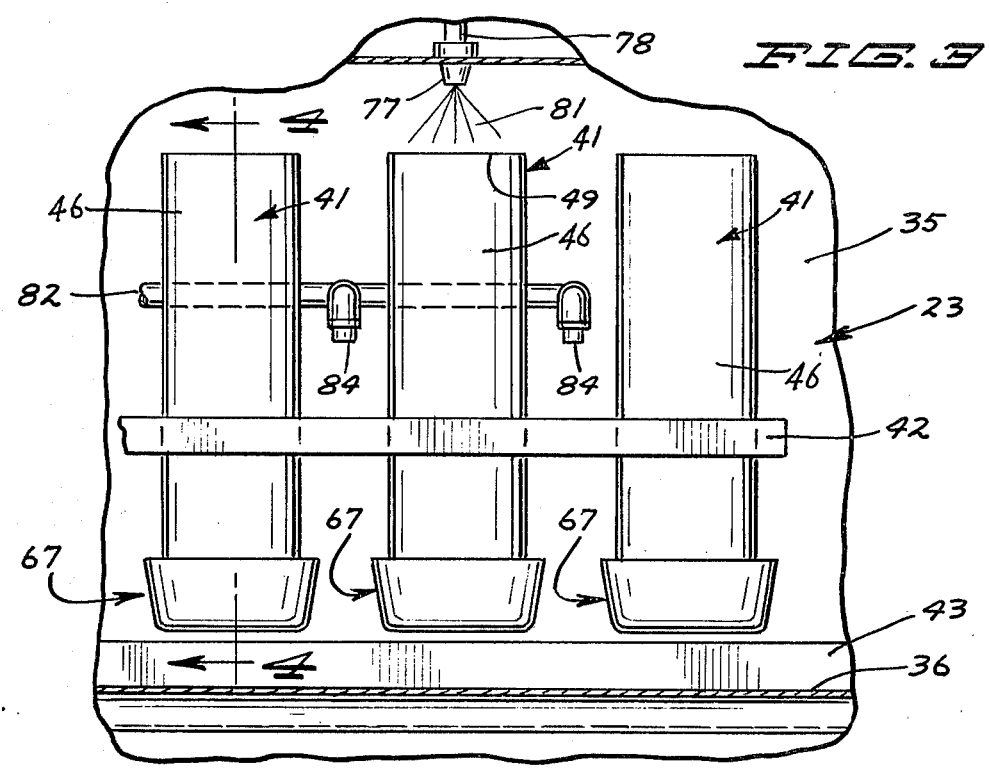
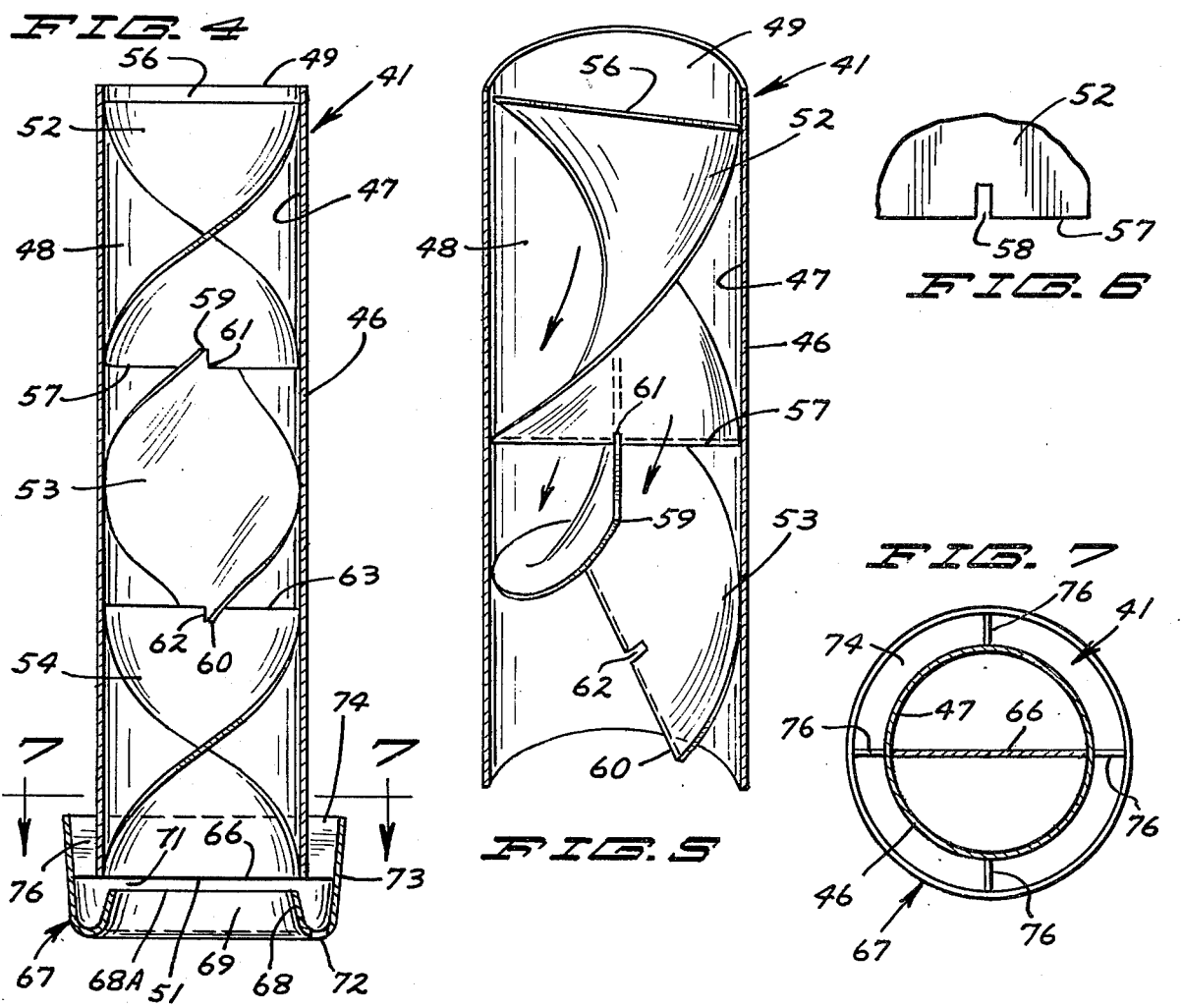

4,038,056

KITCHEN HOOD APPARATUS FOR SEPARATING FOREIGN MATTER FROM FLUID

BACKGROUND OF THE INVENTION

Hoods and suction blowers are used to collect vapors, greases and odors from cooking ranges, fryers, broilers and other cooking equipment and discharge these pollutants to the outside atmosphere. The hoods are positioned above the cooking equipment to collect the pollutants with the air moving through the hoods. Fans in the system operate to draw the hot air and cooking pollutants through the hood and discharge the air and pollutants to the outside atmosphere. In commercial installations, large amounts of smoke and grease laden air are discharged into the atmosphere. This practice results in air pollution and large amounts of heat loss as the heat in the discharged air is not utilized. In some installations, the air is recirculated into the environment after it is passed through grease filters and fiber air filters. An example of this system is shown by Jensen in U.S. Pat. No. 3,260,189.

Baffle separators having conical louver impingement structures are used for oil and water droplet elimination from air. The baffle structure operates to separate particulate material and droplets from the air moving through the separator chamber. An example of a conical louver impingement separator is shown in page 34 of the *Air Pollution Manula - Part II, Control Equipment* published by the American Industrial Hygiene Association. Air cleaners having inclined vanes or deflectors have been used to provide the air with a circular motion so that particulates entrained in the air will be separated from the air by centrifugal forces. Examples are shown by Bull in U.S. Pat. No. 1,743,521 and Moynan in U.S. Pat. No. 1,867,465.

A series of fixed helical elements are used in mixing machines to mix material flowing through a passage. Examples of this structure are shown in U.S. Pat. No. 3,286,992; No. 3,664,638 and No. 3,704,006.

SUMMARY OF THE INVENTION

The invention is broadly directed to a cleaning apparatus operable to separate foreign matter from a fluid, as gas or liquid, as it moves through the apparatus. More particularly, the apparatus is operable to clean air by removing foreign matter from the air with a unit having a plurality of helical means providing the air with centrifugal patterns of movement which separate the foreign matter from the air. The foreign matter is collected with a collector means and delivered to a container for disposal. The unit is a cylindrical member having a tubular passage with an air inlet and an air outlet. A plurality of helical means are located in the passage. Each helical means has a flight with a diameter substantially the same as the diameter of the passage and with about a 180° twist. Adjacent helical means are located about 90° relative to each other so that the air flowing through the passage is divided into separate air streams or patterns which follow the channels created by the helical elements. As the air passes the leading edge of each helical element, it is divided and rotated about its own center in each passage. This rotation is in addition to the general helical rotation of the air whereby the foreign matter is subjected to continuous outwardly directed centrifugal forces which separate the foreign material from the air moving through the passage.

Means for introducing a liquid or cleaning solution is located above each cleaning unit. The means is operable to selectively dispense the liquid into the air moving into the separator units to add moisture to the air by alternatively provide a cleaning solution which cleans the helical elements and the passages of the separator units.

A water dispensing system is coordinated with the separator units to provide a fire extinguishing system. The water dispensing system has a plurality of nozzles located between adjacent separator units which are operable in the event of an increase in temperature, such as would be caused by a fire, to provide a fire extinguishing spray of water or other liquid or gas fire extinguishing materials into the area surrounding the separator units.

An object of the invention is to provide a fluid cleaning apparatus with separator units having a plurality of helical units located in series to remove foreign matter from the fluid. Another object of the invention is to provide an air cleaning apparatus with separator units operable to remove foreign matter from the air and discharge cleaned air back into the environment surrounding the air separators to minimize heat loss to the environment. A further object of the invention is to provide an air cleaning apparatus which does not produce ozone. Yet another object of the invention is to provide an air cleaning apparatus that does not having any moving parts, is efficient in separating foreign matter from air, and is made of non-combustible materials. Another object of the invention is to provide an air cleaning apparatus with a cleaning system that can be operated to periodically dispense cleaning solutions into the system whereby during operation the system is self-cleaning. A further object of the invention is to provide a continuous flow air cleaning apparatus with means for introducing a moisture mist into the air and thereby aid in the separation and collection of foreign materials entrained in the air. Yet another object of the invention is to provide an air cleaning apparatus for cooking equipment with separator apparatus located in a hood assembly for removing foreign materials and odors from the air and recirculating the air into the environment surrounding the cooking equipment.

Another object of the invention is to provide a separator unit that is simple in construction, reliable and efficient in use, compact, self-cleaning and made of incombustible material.

IN THE DRAWINGS

FIG. 1 is a foreshortened front elevational view of a ventilating hood assembly for cooking equipment having the separator units of the invention;

FIG. 2 is a sectional view taken along line 2—2 of FIG. 1;

FIG. 3 is an enlarged sectional view taken along line 3—3 of FIG. 2;

FIG. 4 is an enlarged sectional view taken along line 4—4 of FIG. 3;

FIG. 5 is a perspective view in section of two helical elements located in the passage of a cylindrical member of a separator unit;

FIG. 6 is an enlarged fragmentary view of the trailing end of a helical element of the separator unit of FIG. 4; and FIG. 7 is an enlarged sectional view taken along line 7—7 of FIG. 4.

DESCRIPTION OF PREFERRED EMBODIMENT

Referring to FIGS. 1 and 2, there is shown a hood assembly indicated generally at 10 located over a cooking plate or grill 11. A heat source 12, such an electrical or gas burner, is located below cooking plate 11. Hood assembly 10 is part of cooking equipment that is used in institutional and restaurant trade to remove foreign matter from air moving through the assembly. Hood assembly 10 is also usable as a residential installation to separate particulates, as greases, solid particles, liquid particles, smoke and other foreign material from the air passing through the hood assembly.

The air cleaning of the present invention operates to remove foreign matter from air or other gases carrying the foreign matter. The foreign matter includes smoke, dust, fumes, lint, pollen, particulates, vapors, bacteria, greases, aerosols, odors and other material entrained in the air. The apparatus utilizes a number of air cleaning mechanisms to effectuate the removal of foreign matter from the air. The mechanisms include centrifugal force, gravity, inertia impaction, direct interception, absorption and coagulation. The invention is hereinafter described as an apparatus for removing foreign matter from air in a cooking environment. The apparatus is usable with other gases, liquids and like fluids and in other environments to remove foreign matter from the fluids.

Assembly 10 has a housing indicated generally at 13 enclosing a chamber 14 located above the cooking plate 11. The front 15 of chamber 14 is open to provide access to the cooking plate 11. Housing 13 has upright side walls 16 and 17 joined to a generally horizontal top wall 18. A transverse front wall 19 extends downwardly from the top wall 18 and is joined to the side walls 16 and 17. A light source 21, such as a neon bulb, is mounted on the back of front wall 19 to provide light in chamber 14. An upright back wall 22 extends from the cooking plate 11 upwardly behind top wall 18. Wall 22 forms a part of upper casing or housing 24 defining a chamber 26 located above the top wall 18.

An air filter assembly indicated generally at 23 is mounted on part of top wall 18 and wall 22 and functions to separate the foreign matter, as particulates, vapors, smoke and the like, from the air as it flows through the filtering assembly. The air moves from the filtering assembly 23 through a passage 25 into chamber 26. A plurality of doors 27 movably mounted on casing 24 provide access into chamber 26. Located on top of casing 24 are a pair of exhaust blowers or fans 28. Separate motors 29 drive exhaust fans 28 to move air through the hood assembly 11. A generally rectangular housing 31 encloses the exhaust blowers 28 and motors 29. Housing 31 has a bottom inlet 32 open to chamber 26 and side outlets 33 for discharging air into the environment adjacent the sides of the assembly 11. Other means for moving air through the filter assembly 23 can be used in lieu of fans 28 and can be located remotely from casing 24. Outlets 33 can be connected to suitable air carrying conduits or pipes which will exhaust the air to the outside atmosphere. Preferably, the air is exhausted to the environment surrounding the hood assembly, thereby minimizing the heat loss to the surrounding environment.

Filter assembly 23, shown in FIG. 2, has a transverse upright wall 34 defining with the back wall 22 an elongated transverse chamber 35. The back of chamber 35 is in communication with passage 25. A downwardly and rearwardly inclined bottom wall 36 closes the bottom of chamber 35. A tube, pipe or other material carrying conduit 37 is attached to the back wall 22 and is in communication with the lower back corner of chamber 35. Tube 37 carries the fluid-like foreign materials from chamber 35 into a receiving and storage container 37A located below the heat source 12. An angle shaped wall 36A is attached to the bottom of wall 36 and wall 22 and defines a liquid collecting channel. Wall 36 has an opening 36B connecting chamber 35 with the channel. A drain pipe 89 mounted on wall 22 operates to drain liquid, as water, that collects in the channel formed by wall 36A.

The upper section of wall 34 has a top transverse lip 38 separated from the top wall 18 with a transverse entrance opening 39. A downwardly and rearwardly extended flange is joined with the lip 38 to form the top wall 40 of the filter assembly 23. The top wall 40 has a plurality of entrance or inlet openings 49 which allow the flow of air and entrained foreign matter to a plurality of separator units operable to separate most of the foreign matter from the air. The plurality of units or apparatuses for separating the foreign matter from the air are indicated generally at 41 in FIGS. 1 and 2. The separator units 41 are located in upright, side-by-side positions and are separated from each other. Preferably, units 41 are on 12 inch centers and extend the full length of the back wall 22. The number of units as well as the spacing between the units can vary with the design of the hood assembly.

Transverse support members or straps 42 are secured to each of the units 41 and support the lower portions of the units. The upper portions of units 41 are secured to the top wall 40. Secured to bottom wall 36 below units 41 is upright transverse flange 43 forming a trough 44 with the back wall 22. The lower portion of trough 44 has a bottom opening allowing material to flow to the drain tube 37. Trough 44 serves as a collection and receiving area for the foreign matter that is separated from the air moving through units 41. The particulates move in trough 44 to drain tube 37 which carries the particulates to storage container 37A.

Referring to FIGS. 4–6, unit 41 comprises an upright cylinder or tubular member 46 having an inside cylindrical wall 47. A cylindrical passage 48 extends longitudinally through cylinder 46. The upper end of cylinder 46 has a circular inlet 49. The lower end of cylinder 46 has a circular oulet 51. Cylinder 46 can be a metal member, such as stainless steel, which will not corrode, rust or react with the airborne foreign matter and is non-combustible. Cylinder 46 can be made of synthetic materials, as urethane rubber and the like.

A plurality of end-to-end helical elements 52, 53 and 54 are located in the passage 48. Each helical element has a 180° twist and a flight diameter that is substantially the same as the inside diameter of the cylinder 46. The outside edges of the elements 52, 53 and 54 engage the wall 47. The length of each helical element is about 1½ times the diameter of the element. Other size relationship between the length and the diameter of the helical element can be used. The helical elements 52, 53 and 54 can have twists other than 180°. For example twists of 30°, 45°, 60°, 90°, 120°, 150° and others can be used for each helical element.

Helical element 52 has a leading diametrical edge 56 located adjacent the inlet 49. The opposite or trailing edge 57 is in generally the same vertical plane as edge 56. As shown in FIG. 6, edge 57 has a central notch 58.

Helical element 53 has a leading edge 59 and a trailing edge 60. Leading edge 59 has a central notch 61 and trailing edge 60 has a notch 62. Edges 59 and 60 are located in generally the same vertical plane. The plane of edges 59 and 60 is approximately normal, or 90°, with respect to the vertical plane of the edges 56 and 57 of helical element 52. Notches 58 and 61 provide a dovetail or interlocking connection between elements 52 and 53. The elements 52 and 53 are secured at their interlocking portions with welds or like fastening structures.

Helical element 54 has a leading edge 63 formed with a central notch 64. Notch 64 meets with notch 62 in helical element 53 to provide for the dovetail or interlocking connection. Suitable fastening means, as welds or the like, are used to secure elements 53 and 54 together. The lower end of element 54 has trailing edge 66 in general alignment with the outlet opening 51 of the cylinder 46. The edges 63 and 66 are located in generally the same vertical plane. The plane of edges 63 and 66 is normally disposed, or at 90°, with respect to the vertical plane of the edges 59 and 60 of helical element 53. Helical elements 52 and 54 are secured to the cylinder 46 with welds or the like. Edges 59 and 60 and edges 63 and 66 can be positioned at angles of 30°, 45°, 60° and other angles relative to each other. Also, the opposite ends of a helical element can be at different angles.

Referring to FIGS. 4 and 7, there is shown a foreign matter collector indicated generally at 67 located adjacent the outlet 51 of the cylinder 46. Collector 67 functions to receive the foreign matter moving down the inside wall 47 and deliver the foreign matter to an outlet and discharge tube 37. Collector 67 also permits the major portion of the air to flow through collector 67 into the chamber 35. Collector 67 has an inwardly tapered flange 68 surrounding a central opening 69. Opening 69 is in longitudinal alignment with the longitudinal axis of passage 48. Flange 68 has an upper edge 68A spaced from the lower edge or outlet 66. The edge 68 is located inwardly of the outlet end of cylinder 46 and forms therewith an annular space or throat 71. An annular core or sheath of air moving through throat 71 carries the foreign matter into the collector 67. Throat 71 leads to an enlarged annular chamber adjacent the lower end of tube 46. The chamber allows the air to expand and reduce in its velocity whereby the foreign matter can settle into the bottom of the chamber. The lower part of collector 67 has a hole 72 in alignment with the top of trough 44, as shown in FIG. 2, whereby the foreign matter in collector 67 flows into the trough 44. Collector 67 has an outside circumferential wall 73 that extends upwardly adjacent the outlet end of the cylinder 46. The wall 73 is outwardly spaced from the wall providing the annular collection chamber and a passage for the flow of air through the collector 67. A plurality of short radial ribs 76, shown in FIG. 7, secure the flange 73 to the outside of cylinder 46.

Referring to FIG. 2, a liquid, as water, can be introduced into the top of the apparatus for separating foreign matter from the air and adding moisture to the air moving through the aperture 41. The liquid can be a cleaning solution, as a deterent or sanitizer, to wash the unit 41. A nozzle 77 is mounted on the top wall 18 in alignment with the top of the cylinder 46. The nozzle 77 is connected to a tube 78 leading to a manifold or liquid supply pipe 79. The pipe 79 is connected to a container and suitable valves (not shown). The liquid is subjected to pressure whereby the liquid is moved through the manifold 79 and tube 78 and discharged by nozzle 77 as a spray or mist 81 directly above the inlet of cylinder 46. Suitable controls (not shown) as valves, are used to control the flow of fluid in the manifold 79. The top wall 18 carries a plurality of nozzles 77. A nozzle 77 is located above each apparatus 41, as shown in FIG. 1. The liquid supply container, controls, manifold 79 and tubes 78 are located in chamber 26 of the wall 18. The controls are readily accessible through the openings closed by doors 27.

A transverse water pipe 82 is located behind the units 41. A bracket 83 secured to back wall 22 accommodates fasteners, as U-bolts, to hold the pipe 82. A plurality of nozzle units 84 are mounted on pipe 82. Nozzle units 84 extend between adjacent cylinders 46, as shown in FIGS. 3, and have discharge ends which face in a downward direction. An upright feeder pipe 86 is connected to the pipe 82. Feeder pipe 86 extends to a control unit 87 mounted on the back of wall 22. Control unit 87 has a solenoid valve operable to permit the flow of water from a supply pipe 88 into the feeder pipe 86. The water flows through the pipe 87 and is discharged to the nozzle units into chamber 35. Suitable temperature sensing elements (not shown) are located in the chamber 35 and are operable to activate the solenoid in the event there is a substantial increase in temperature in the chamber which could be caused by a fire. The water discharged into chamber 35 is collected in the lower portion of the chamber and flows along bottom wall 36A through a drain pipe 86 leading to a suitable drain. Additional temperature responsive water sprinklers may be attached to top wall 18 and automatically activated in case there is a fire over the cooking plate 11 in chamber 14.

In use, the motors 29 operate the exhaust fans or blowers 28 and thereby move air through the hood assembly. The air is discharged through the outlets 33 into the environment surrounding the hood assembly. The air moves through the chamber 14 over the cooking plate or grill 11 and picks up foreign matter in the chamber. The air moves upwardly and into the cylinder inlets 49 rearwardly of the lip 38. The moving air entrains the foreign matter, as particulates and smoke, generated by cooking on plate 11.

The air moving through the cylinder passage 48 is accelerated and rotated by subjecting the foreign matter carried by the air to an outward centrifugal force moving the foreign matter in engagement with the inside wall 47. The helical elements 52, 53 and 54, being oriented 90° with respect to each other, divide the air stream into separate steams as it moves through passage 48. The air is divided at the leading edge of each element and follows the contours created by the spiral or helical shape of the elements. At each succeeding element, the two helical air streams are further divided. The number of air stream divisions produced is 2n, where $n$ is the number of elements.

The geometry of the helical twist of the elements 52, 53 and 54 produces a rotational circulation of the air stream of its own hydraulic center in each helical stream. This produces an additional centrifugal force on the foreign matter which drives it into engagement with the inside surface 47. The centrifugal forces created by the moving and rotating air hold the foreign matter against the inside wall and move the foreign matter in a downward direction along the wall. The foreign matter is also collected on the surfaces of the helical elements. The centrifugal force due to the air stream rotation on its own hydraulic center moves the foreign matter toward the surfaces of the helical element and toward the cylinder wall 47. All of the rotation of the air is in the same direction, thereby requiring less energy to move the air through passage 48, as compared to a conventional baffle filter. The constant current rotation of the separate air flows and helical movement of the air flows through passage 48 in the same direction bring more of the smaller foreign particles into engagement with the impinging surfaces of the cylinder 46 and the helical elements 52, 53 and 54. The lighter particles in the center of the air stream do not require the entire radial distance to impinge upon one of the collecting surfaces. This reduces the time span necessary to collect the smaller particles to overcome the effect of the air stream viscosity. The constant dividing of the air stream by helical elements 52, 53 and 54 also brings the foreign matter closer to the impinging surfaces of the cylinder 46 and the helical elements 52, 53 and 54. The helical elements, being fixed to the cylinder 46, do not provide for moving parts and are readily cleaned by the passage of cleaning solution or sanitizing liquid through passage 48.

The liquid and mist particulates will collect on the wall 47 and form droplets which will flow downwardly into collector 67. The dry particulates, as dust or smokes, will be moved under the effect of centrifugal force into engagement with the wall and will mix and impinge on the liquid droplets. The liquid droplets function as an adhesive or collecting agent which retains the dry particulates and removes the particulates from the air stream. Smoke particulates and odor molecules will also impinge and adhere to the collected liquid droplets.

Collector cup 67 minimizes the amount of foreign matter that reenters the air stream. The collector cup forms a small annular throat 71 between the outlet 66 and the flange edge 68. This throat serves as annular venturi throat 71 which sucks the foreign matter into the collector 67. The foreign matter flows through hole 72 into the trough 44. The air flowing through throat 71 quickly reduces its velocity whereby the foreign matter can settle to the bottom of collector 67. The foreign matter drains from collector 67 through hole 72 into trough 44. Conduit 37 carries the foreign matter from trough 44 to container 37A.

The above disclosure is of one embodiment of the invention. It is understood that changes in materials, number of units, and size of the helical elements and units may be made without departing from the invention. Also, the pitch of the helical elements can be changed as well as the number of helical elements that are placed in series in the cylinder 46. The angular relationship between adjacent ends of the helical elements can vary and the angular positions of the opposite ends of a helical element can differ.

The embodiments of the invention in which an exclusive property or privilege is claimed are defined as follows:

1. An apparatus for separating foreign matter from a fluid carrying the foreign matter comprising: an upright cylindrical wall forming a tubular passage with an upper fluid inlet end and a lower fluid outlet end, said wall having a continuous uninterrupted fluid impervious inside surface, helical means located in the passage along the longitudinal length of the passage, said helical means comprising a plurality of helical flights each with a diameter substantially the same as the diameter of the passage and with about 180° twist, said helical flights located in end to end relationship with adjacent helical flights having the same twist direction and terminating with an edge which is located circumferentially oriented about 90° relative to the leading edge of the adjacent flight whereby when fluid and foreign matter flows through the passage the fluid and foreign matter is divided into separate streams at each flight and follows a helical path and said foreign matter entrained in the fluid is collected on the inside surface of the wall and, said collected foreign matter moving outwardly and along the inside surface of the wall toward the fluid outlet end of the passage, and annular collecting means fixed with respect to the wall located adjacent the outlet end of the wall to collect foreign matter that moves off the outlet end of the wall and to permit cleaned fluid to pass centrally thereof, said collecting means having an outer annular wall surrounding the outlet end of the cylindrical wall and an inner annular flange surrounding a fluid outlet opening aligned with the outlet end of the tubular passage to permit cleaned fluid to flow through the collecting means, said flange having a diameter smaller than said passage and spaced from the outlet end of said cylindrical wall thereby foreign matter moves from the cylindrical wall to the collecting means, and drain means between said annular wall and flange to allow collected foreign matter to drain from the collecting means.

2. The apparatus of claim 1 wherein: each helical means has a leading edge and a trailing edge, the leading and trailing edges of adjacent helical means having notches which accommodate portions of the leading and trailing edges of the adjacent helical means.

3. The apparatus of claim 1 including: means operable to introduce a liquid into the inlet of the passage.

4. The apparatus of claim 1 wherein: the means to collect foreign matter includes a cup-like member having an inside flange surrounding a passage through the member, said flange having a diameter smaller than the diameter of the inside cylindrical wall and annularly spaced from the wall to provide an annular throat, and said flange being located in axial alignment with the tubular passage adjacent the outlet end thereof whereby fluid flows through said passage and foreign matter and fluid flows through the annular throat and foreign matter is collected in the cup-like member.

5. The apparatus of claim 4 wherein: said cup-like member has an outside flange extended around the lower end of the wall, said outside flange being radially spaced from said wall and providing a second passage for the flow of fluid around the lower end of the wall, and means connecting the outside flange to the wall.

6. An apparatus for separating foreign matter from a fluid carrying the foreign matter comprising: an upright uninterrupted fluid impervious tubular wall defining a passage and an upper fluid inlet end and a lower fluid outlet end open to the passage, helical means for directing the fluid along a helical path through said passage, said helical means comprising a plurality of helical sections being twisted in the same direction and located in end to end relationship and each having terminal edges circumferentially oriented relative to each other to divide the fluid and foreign matter moving through the passage into separate streams whereby when fluid and foreign matter flows through the passage the fluid and foreign matter follows the helical path and is divided in separate streams at each adjacent segment and the foreign matter entrained in the fluid is moved outwardly and in the direction of the flow of fluid through the passage into engagement with said wall, said foreign material being collected on said wall and moved along said wall toward the outlet end, and annular collecting means fixed with respect to the wall located adjacent the outlet end of the wall to collect foreign matter discharged from the walls of said passage at the outlet end of the wall and to permit cleaned fluid to pass centrally thereof, said collecting means having an annular wall surrounding the outlet end of the tubular wall, said annular wall including an inner annular flange surrounding a fluid outlet opening aligned with the outlet end of the passage to permit cleaned fluid to flow through the collecting means, said flange having a diameter smaller than said passage and spaced from the outlet end of said tubular wall whereby foreign matter moves from the tubular wall to the collecting means, and drain means in said annular wall to allow collected foreign matter to drain from the collecting means.

7. The apparatus of claim 6 including: means operable to introduce a liquid into the inlet end of the passage.

8. The apparatus of claim 6 wherein: each helical section includes a helical element having a continuous helical flight with approximately 180° twist, said flight having a diameter substantially the same as the diameter of the passage.

9. The apparatus of claim 8 wherein: adjacent helical elements have ends that are normally disposed relative to each other.

10. The apparatus of claim 9 wherein: the adjacent ends of the helical elements have notches which accommodate adjacent portions of the adjacent helical elements.

11. The apparatus of claim 6 wherein: the means to collect the foreign matter includes a member having an inside flange surrounding a passage through the member, said flange being spaced from the outlet end of the wall forming an annular outlet opening with the wall, said flange being located in longitudinal alignment with the passage formed by the wall whereby fluid can flow through said passage of the member and the separated foreign matter flows through the annular outlet opening.

12. The apparatus of claim 11 wherein: said member has an outside flange extended around the outlet end of the wall, said outside flange being radially spaced from said wall and providing a second passage for the flow of fluid around the outlet end of the wall.

13. A hood assembly for use with cooking equipment for collecting gas and foreign matter and separating the foreign matter from the gas comprising: housing means having wall structure defining a chamber having an open forward side for receiving gas and foreign matter from the cooking equipment, a plurality of foreign matter separator units mounted on the wall structure, each of said units having an upright uninterrupted fluid impervious cylindrical wall defining a tubular passage, an upper inlet end open to said passage and said chamber and a lower outlet end open to the passage, means for drawing contaminated gas through said passage and exhausting the cleaned gas, each of said separator units having helical means located in and extended along the length of their respective passages, each helical means comprising a plurality of helical flights each with a diameter substantially the same as the diameter of the associated passage and with about 180° twist, said helical flights, being twisted in the same direction and located in end to end relationship with adjacent helical flights in each passage having terminal edges circumferentially orientated about 90° relative to each other to divide the gas and foreign matter moving in the passage into separate streams at each flight whereby gas and foreign matter flowing through the respective passages follows a helical path and the foreign matter entrained in the gas moves outwardly into engagement with and toward the outlet end of said cylindrical wall, and annular collecting means fixed with respect to the cylindrical wall adjacent the outlet end of each cylindrical wall to collect the foreign matter moving from the cylindrical wall and to permit cleaned gas to pass centrally thereof, said collecting means having an outer annular wall surrounding the outlet end of the cylindrical wall and an inner annular flange surrounding a gas outlet opening aligned with the outlet end of the tubular passage to permit cleaned gas to flow through the collecting means, said flange having a diameter smaller than said passage and spaced from the outlet end of said cylindrical wall whereby foreign matter moves from the cylindrical wall to the collecting means, and drain means between said annular wall and flange to allow collected foreign matter to drain from the collecting means.

14. The hood assembly of claim 13 including: means operable to introduce a liquid into the inlets of each of the passages.

15. The hood assembly of claim 13 wherein: each helical means has a leading edge and a trailing edge, the leading and trailing edges of adjacent helical means having notches which accommodate portions of the leading and trailing edges of the adjacent helical means.

16. The hood assembly of claim 13 wherein: the means to collect foreign matter includes a cup-like member having an inside flange surrounding a first passage through the member, said flange having a diameter smaller than the diameter of the passage and spaced from the wall forming an annular outlet opening with the wall, said flange being located in axial alignment with the tubular passageway whereby gas flows through the first passage and foreign matter flows through the annular outlet opening and is collected in the cup-like member.

17. The hood assembly of claim 16 wherein: said cup-like member has an outside flange extended around the lower end of the cylindrical wall, said outside flange being radially spaced outwardly from said wall and providing a second passage for the flow of gas around the outlet end of the wall and means connecting the outside flange to the cylindrical wall.

18. The hood assembly of claim 16 including: means located between adjacent separator units operable to dispense fire quenching substance into the area surrounding the separator units.

19. A hood assembly for use with cooking equipment for collecting gas and foreign matter and separating the foreign matter from the gas comprising: housing means having wall structure defining a chamber having an open forward side for receiving gas and foreign matter from the cooking equipment, a plurality of foreign matter separator units, each of said units having an upright uninterrupted fluid impervious wall forming a tubular passage, an upper inlet end open to said passage and said chamber, and a lower outlet end open to said passage, means mounting the separator units in the housing means, means for drawing gas and foreign matter through said passage of each unit and exhausting the matter through said passage of each unit and exhausting the cleaned gas, each of said separator units having helical means located in and extended along the length of their respective passages, each helical means comprising a plurality of helical sections, said helical sections located in end to end relation with adjacent sections having terminal edges circumferentially oriented relative to each other to divide the gas and foreign matter flowing through the passage into separate streams whereby gas and foreign matter flowing through the respective passages follows a helical path and the foreign matter entrained in the gas moves outwardly into engagement with said wall and toward the outlet end of said wall, and annular collecting means mounted in the housing means adjacent the outlet end of said wall to collect the foreign matter moving from the end of said wall and to permit cleaned gas to pass centrally thereof, said collecting means having an annular wall surrounding the outlet end of the wall forming the tubular passage, said annular wall including an inner annular flange surrounding a gas outlet opening aligned with the outlet end of the passage to permit clean gas to flow through the collecting means, said flange having a diameter smaller than said pressure and spaced from the outlet end of said wall forming the tubular passage whereby foreign matter moves from the wall forming the tubular passage to the collecting means and drain means in said annular wall to allow collected foreign matter to drain from the collecting means.

20. The hood assembly of claim 19 including: means operable to introduce a liquid into the inlets of each of the passages.

21. The hood assembly of claim 19 wherein: each helical means has a leading edge and a trailing edge, the leading and trailing edges of adjacent helical means having notches which accommodate portions of the leading and trailing edges of the adjacent helical means.

22. The hood assembly of claim 19 wherein: the means to collect foreign matter includes a member having an inside flange surrounding a first passage through the member, said flange having a diameter smaller than the diameter of the passage and spaced from the wall forming an annular outlet opening with the wall, said flange being located in axial alignment with the tubular passage whereby gas flows through the first passage and foreign matter flows through the annular outlet opening and is collected in the member.

23. The hood assembly of claim 22 wherein: said member has an outside flange extended around the lower end of the wall, said outside flange being radially spaced from said wall providing a second passage for the flow of gas around the end of the wall.

24. The hood assembly of claim 22 including: means located between adjacent separator units operable to dispense fire quenching substance into the area surrounding the separator units.

25. The hood assembly of claim 19 wherein: said helical sections include helical elements having transverse ends, adjacent ends being angularly located relative to each other.

26. The hood assembly of claim 25 wherein: the angular relationship of the adjacent ends is between 30° and 90°.

* * * * *

UNITED STATES PATENT AND TRADEMARK OFFICE
CERTIFICATE OF CORRECTION

PATENT NO. : 4,038,056
DATED : July 26, 1977
INVENTOR(S) : WOLODYMYR DIACHUK ET AL It is certified that error appears in the above-identified patent and that said Letters Patent are hereby corrected as shown below:

Column 5, line 60, "aperture" should be -- apparatus --.

Column 5, line 61, "deterent" should be -- detergent --.

Column 6, line 15, "Figs." should be -- Fig. --.

Column 10, line 37, "passageway" should be -- passage --.

Column 11, line 20, "pressure" should be -- passage --.

Signed and Sealed this

First Day of November 1977

[SEAL]

Attest:

RUTH C. MASON
Attesting Officer

LUTRELLE F. PARKER
Acting Commissioner of Patents and Trademarks